(12) United States Patent
Park

(10) Patent No.: US 9,666,076 B2
(45) Date of Patent: May 30, 2017

(54) WARNING METHOD AND SYSTEM THEREFOR

(71) Applicant: Hyundai Motor Company, Seoul (KR)

(72) Inventor: Ki Ru Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 24 days.

(21) Appl. No.: 14/752,948

(22) Filed: Jun. 28, 2015

(65) Prior Publication Data

US 2016/0167578 A1 Jun. 16, 2016

(30) Foreign Application Priority Data

Dec. 16, 2014 (KR) ........................ 10-2014-0180961

(51) Int. Cl.
*B60Q 1/00* (2006.01)
*G08G 1/16* (2006.01)
*G06F 1/16* (2006.01)
*G04G 21/04* (2013.01)

(52) U.S. Cl.
CPC .............. *G08G 1/16* (2013.01); *G06F 1/163* (2013.01); *G04G 21/04* (2013.01); *G08G 1/167* (2013.01)

(58) Field of Classification Search
CPC .. B60Q 9/008; B60R 2021/0027; G01C 21/26
USPC ........... 340/435, 426.18, 436, 463, 466, 473
See application file for complete search history.

(56) References Cited

U.S. PATENT DOCUMENTS

| 2002/0196134 A1* | 12/2002 | Lutter | G08G 1/166 340/426.1 |
| 2013/0142393 A1* | 6/2013 | Lord | G06K 9/00805 382/105 |
| 2015/0149088 A1* | 5/2015 | Attard | G01C 21/36 701/538 |

FOREIGN PATENT DOCUMENTS

| JP | 2011-225189 A | 11/2011 |
| JP | 2011-248855 A | 12/2011 |
| JP | 2014-151892 A | 8/2014 |
| KR | 10-0400945 B1 | 10/2003 |
| KR | 10-1109580 B1 | 1/2012 |
| KR | 10-2012-0048981 A | 5/2012 |
| KR | 10-1166351 B1 | 7/2012 |
| KR | 10-2014-0041005 A | 4/2014 |
| KR | 10-1421529 B1 | 8/2014 |

* cited by examiner

*Primary Examiner* — Phung Nguyen
(74) *Attorney, Agent, or Firm* — Mintz Levin Cohn Ferris Glovksy and Popeo, P.C.; Peter F. Corless

(57) ABSTRACT

A warning method and a system are provided. The warning system includes a wireless communication unit that is connected to a wearable device via short range communication. In addition, an information collection unit is configured to collect information regarding at least one of a danger of collision of a vehicle, a velocity of the vehicle, and lane departure of the vehicle. A controller is then configured to transmit a predetermined signal for a warning to the wearable device via the wireless communication unit, based on the information collected by the information collection unit.

18 Claims, 8 Drawing Sheets

FIG. 3

| level of urgency | first kind of wearable device | second kind of wearable device | third kind of wearable device |
|---|---|---|---|
| high | strong vibration + sound | image/light + sound | strong vibration |
| middle | strong vibration | image/light | discrete vibration |
| low | weak vibration | image | weak vibration |

WARNING METHOD AND SYSTEM THEREFOR

CROSS REFERENCE TO RELATED APPLICATION(S)

This application claims the benefit of Korean Patent Application No. 10-2014-0180961, filed on Dec. 16, 2014, which is hereby incorporated by reference as if fully set forth herein.

BACKGROUND

Field of the Invention

The present invention relates to a warning method and a system therefor, and more particularly, to a warning method and system in which a warning, indicating a dangerous situation during driving, is provided to a user through a wearable device.

Discussion of the Related Art

Recently, vehicles are generally provided with front sensors, rear sensors, imaging devices, etc. to sense danger (e.g., other vehicles, objects, pedestrians, etc.) during driving and provide an auditory warning to a user when there is a risk of a collision. However, when a user listens to music or feels drowsy during driving, an auditory warning is insufficient to notify a driver of such danger. Accordingly, a unit that provides a tactile warning using a seat, a steering wheel, a pedal and the like is being developed. However, such a unit may cause an increase in production costs or may hinder driving.

SUMMARY

Accordingly, the present invention is directed to a warning method and a system therefor which may provide a warning to a user through a wearable device when a dangerous situation occurs during driving.

Another object of the present invention is to provide a warning method and a system therefor which may employ various warning types based on kinds of wearable devices pairing with a vehicle. Yet another object of the present invention is to provide a warning method and a system therefor which may employ various warning types based on levels of urgency of a dangerous situation, that is, based on risk levels.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a warning system may include a wireless communication unit connected to a wearable device via short range communication, an information collection unit configured to collect information regarding at least one of a vehicle collision danger, a velocity of the vehicle, and lane departure of the vehicle, and a controller configured to transmit a predetermined signal for a warning to the wearable device via the wireless communication unit, based on the information collected by the information collection unit.

In another aspect of the present invention, a warning method may include performing short communication connection with a wearable device, collecting information regarding at least one of a vehicle collision danger, a velocity of the vehicle, and lane departure of the vehicle, and transmitting a predetermined signal for a warning to the wearable device based on the collected information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings:

FIG. 3 is an exemplary table illustrating a database in which warning types varying based on levels of warning urgency and types of a wearable device in a danger warning system in accordance with one exemplary embodiment of the present invention;

DETAILED DESCRIPTION

Figure 1:
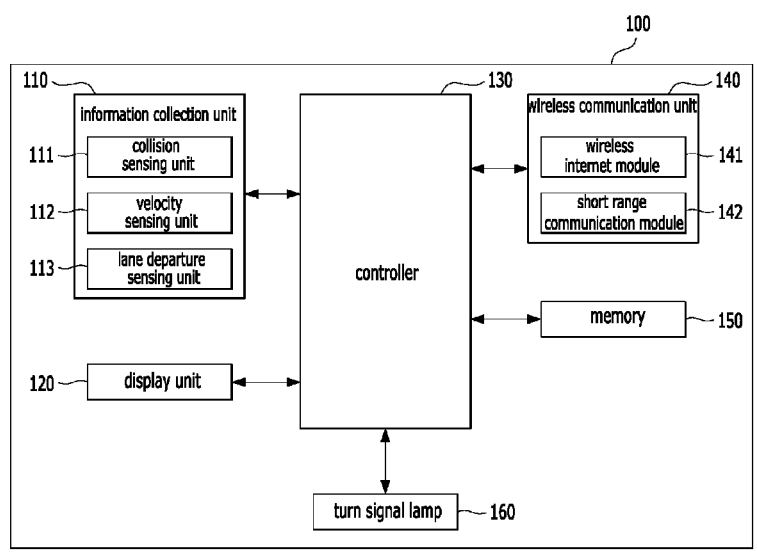
FIG. 1 is an exemplary diagram illustrating component modules of a vehicle in accordance with one exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Reference will now be made in detail to the exemplary embodiments of the present invention, examples of which are illustrated in the accompanying drawings. In the drawings, the same or similar elements are denoted by the same reference numerals even though they are depicted in different drawings, and a detailed description thereof will be omitted. The suffixes "module" and "unit" in elements used in the description below are given or used together only in consideration of ease in preparation of the specification and do not have distinctive meanings or functions.

FIG. 1 is a diagram illustrating component modules of a vehicle in accordance with one exemplary embodiment of the present invention. Some of component modules of a vehicle 100 may be preinstalled within the vehicle 100 or be component modules of external devices. Among the component modules shown in FIG. 1, component modules necessary to provide a warning regarding a dangerous situation generated during driving may be combined and referred to as a warning system.

With reference to FIG. 1, the vehicle 100 may include an information collection unit 110, a display unit 120, a controller 130, a wireless communication unit 140, a memory, and a turn signal lamp 160. The controller 130 (e.g., vehicle controller 130) may be configured to operate the various units of the vehicle 100. However, according to exemplary embodiments, the vehicle 100 may include less component modules or more component modules, two or more component modules shown in FIG. 1 may be combined into one component module, and one component module shown in FIG. 1 may be divided into two or more component modules.

The information collection unit 110 may be configured to collect information regarding the state of the vehicle 100, a dangerous situation (e.g., collision risk) generated during driving and the like. The information collection unit 110 may include at least one of a collision sensing unit 111, a velocity sensor 112, and a lane departure sensor 113. The collision sensing unit 111 may be configured to sense a vehicle collision risk and a collision risk with an external object or person and may include a front collision sensor, a rear collision sensor, a side collision sensor and the like.

Further, the velocity sensor 112 may be configured to sense the velocity of the vehicle 100. The lane departure sensor 113 may be configured to sense whether the vehicle 100 departs from a lane (e.g., remains in the traveling lane) based on captured images using imaging devices (e.g., camera, video cameras, etc.) disposed at the front and/or rear regions. According to exemplary embodiments, the information collection unit 110 may be configured to collect information regarding safety in addition to a collision danger (e.g., risk), a sensed velocity and whether the vehicle 100 departs from a lane.

The display unit 120 may be configured to output information processed by the controller 130. In particular, the display unit 120 may be configured to output information regarding the current state of the vehicle 100. The wireless communication unit 140 may be configured to communicate wirelessly with an external device. The external device may be a device which is not embedded within the vehicle 100 even if disposed within the vehicle 100. The wireless communication unit 140 may include one of a wireless Internet module 141 and a short range communication module 142.

The wireless Internet module 141 refers to a module for wireless Internet access and may be configured to transmit and receive a wireless signal in a communication network based on wireless internet technologies. For example, wireless internet technologies include Wireless LAN (WLAN), Wireless-Fidelity (Wi-Fi), Wireless-Fidelity (Wi-Fi) Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA) and the like.

The short range communication module 142 is a module for short range communication and may support short range communication using at least one of Bluetooth, Radio Frequency Identification (RFID), Infrared Data Association (IrDA), Ultra Wideband (UWB), ZigBee, Near Field Communication (NFC), Wireless-Fidelity (Wi-Fi), Wireless-Fidelity (Wi-Fi) Direct, and Wireless Universal Serial Bus (USB).

In accordance with the present invention, the wireless communication unit 140 may be configured to transmit and receive data with a wearable device connected thereto via wireless communication. Particularly, wireless communication may be short range communication. The controller 130, when a wearable device has a history of connection thereto via wireless communication is sensed, may be configured to operate the wireless communication unit 140 to automatically perform wireless communication (e.g., pairing) with the sensed wearable device.

The memory 150 may be configured to store programs, algorithms, applications and the like necessary for operating the vehicle 100. Additionally, the turn signal lamp 160 may be configured to output light flickered (e.g., light on and off in a pattern) by user manipulation. The controller 130 may be configured to sense whether the vehicle 100 departs from a lane (e.g., remains within a traveling lane boundary) without turning-on the turn signal lamp 160 based on on/off of the turn signal lamp 160 and information collected by the lane departure sensing unit 113.

Furthermore, the controller 130 may be configured to execute the overall operations of the respective component modules. The controller 130 may be configured to determine whether a dangerous situation requiring a warning occurs based on information collected by the information collection unit 110. In response to determining a dangerous situation occurs based on information collected by the information collection unit 110, the controller may be configured to determine a level of warning urgency (e.g., a warning risk level) based on a predetermined standard. In particular, data used to determine a dangerous situation and to determine a warning urgency level may be pre-stored in the memory 150.

Figure 2:
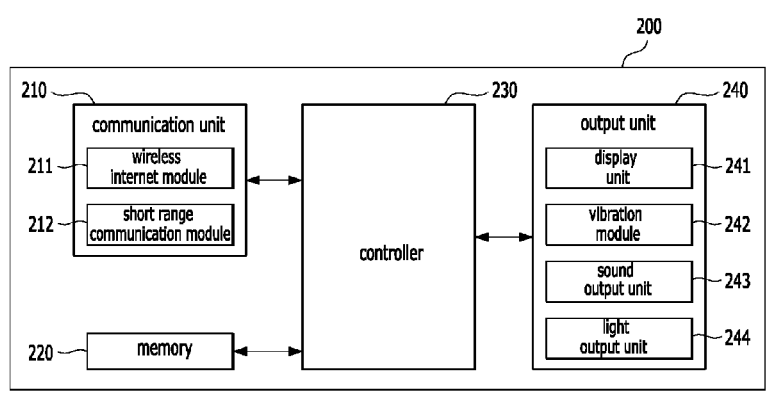
FIG. 2 is an exemplary diagram illustrating component modules of a wearable device in accordance with one exemplary embodiment of the present invention.

FIG. 2 is a diagram illustrating component modules of a wearable device in accordance with one exemplary embodiment of the present invention. A wearable device described in the present invention is a device that may be wearable on a user's body (e.g., attaches externally to a user) and may include a smart watch, smart glasses, a head mounted display (HMD), smart clothing, or smart shoes.

With reference to FIG. 2, a wearable device 200 may include a communication unit 210, a memory 220, a controller 230, and an output unit 240. The controller 230 (e.g., device controller 230) may be configured to operate the various units of the wearable device 200. However, according to exemplary embodiments, the wearable device 200 may include less component modules or more component modules, two or more component modules shown in FIG. 2 may be combined into one component module, and one component module shown in FIG. 2 may be divided into two or more component modules.

The communication unit 210 may be configured to perform wireless communication with an external device. The communication unit 210 may include one of a wireless internet module 211 and a short range communication module 212. The wireless Internet module 211 and the short range communication module 212 are similar to the wireless Internet module 111 and a short range communication module 112 shown in FIG. 1 and a detailed description thereof will thus be omitted.

The memory 220 may be configured to store programs, algorithms, applications and the like necessary for operation of the wearable device 200. The controller 230 may be configured to execute the overall operations of the respective component modules. Further, the output unit 240 may be configured to output information processed by the controller 230 and output information indicating the state of the wearable device 200. The output unit 240 may include at least one of a display unit 240, a vibration module 242, a sound output unit 243, and a light output unit 244. The types of modules included in the output unit 240 and the number of the modules may vary according to the type of the wearable device 200.

The display unit 241 may be configured to output image data, graphic data, video data and the like. The vibration module 242 may be configured to generate designated vibration when an event occurs (e.g., in response to a trigger event). The sound output unit 243 may be configured to output audio data that provides an indication an event occurrence or output audio data stored in the memory 220. The light output unit 244 may be configured to output light that provides an indication of an event occurrence.

With reference to FIGS. 1 and 2, one example of a warning method in accordance with the present invention will be described below. In the present invention, it may be assumed that the vehicle 100 and the wearable device 200 are connected via wireless communication. When the wearable device 200 enabling wireless communication is sensed, the controller 130 of the vehicle 100 may be configured to operate the wireless communication unit 140 to perform wireless communication with the wearable device 200 based on a user's command or automatically.

In response to determining that a dangerous situation occurs (e.g., a collision risk is determined) based on information collected by the information collection unit 110, the controller 130 of the vehicle 100 may be configured to operate the wireless communication unit 140 to transmit a predetermined signal for a warning to the wearable device 200. The predetermined signal may include at least one of data for a vibration output warning, data for an image output warning, data for an audio output warning, and data for a light output warning.

The data for a vibration output warning may include at least one of data regarding a vibration pattern, data regarding a vibration intensity, and data regarding a vibration time. The data for an image output warning may include at least one of image data regarding respective dangerous situations, data regarding an output pattern of the image data, and data regarding an output time of the image data. The data for an audio output warning may include at least one of audio data regarding the respective dangerous situations, data regarding an output time of the audio data, and data regarding an output intensity of the audio data. The data for a light output warning may include at least one of light data regarding the respective dangerous situations, data regarding an output pattern of the light data, data regarding an output intensity of the light data, and data regarding an output time of the light data. Data included in the predetermined signal for a warning may be pre-stored in the memory 150.

According to exemplary embodiments, the controller 130 of the vehicle 100 may be configured to determine a level of warning urgency according to a predetermined standard, based on information collected by the information collection unit 110 and determine presence of respective data included in the predetermined signal and sizes of the data, based on the determined level of warning urgency. For example, as the level of warning urgency increases, the size of the data included in the predetermined signal may increase or types of data may increase and, as the level of warning urgency decreases, the size of the data included in the predetermined signal may decrease or types of data may decrease.

As one example, when collision of the vehicle 100 is imminent or when lane departure of the vehicle 100 is sensed in spite of a danger of collision based on information collected by the information collection unit 110, the controller 130 may be configured to determine the level of warning urgency as a level 1. In response to determining the level of warning urgency as the level 1, the controller 130 may be configured to operate the wireless communication unit 140 to transmit a predetermined signal, including data for an audio output warning and data for a vibration output a warning that corresponds to a continuous vibration pattern and a predetermined vibration intensity or greater, to the wearable device 200. Otherwise, in response to determining the level of warning urgency as the level 1, the controller 130 may be configured to operate the wireless communication unit 140 to transmit a predetermined signal, including data for an image output warning that corresponds to an image having a predetermined size or more and/or data for a light output warning that corresponds to predetermined brightness or greater, to the wearable device 200.

As another example, when the velocity of the vehicle is a predetermined level or greater based on information collected by the information collection unit 110, the controller 130 may be configured to determine the level of warning urgency as a level 2. In response to determining the level of warning urgency as the level 2, the controller 130 may be configured to operate the wireless communication unit 140 to transmit a predetermined signal including data for a vibration output warning that corresponds to a discrete vibration pattern and a vibration intensity within a predetermined range to the wearable device 200. Otherwise, in response to determining the level of warning urgency as the level 2, the controller 130 may be configured to operate the wireless communication unit 140 to transmit a predetermined signal, including data for an image output warning corresponding to an image having a predetermined size or less and/or data for a light output warning that corresponds to predetermined brightness or less, to the wearable device 200.

As yet another example, when lane departure of the vehicle 100 is sensed and the turn signal lamp 160 is turned off based on information collected by the information collection unit 110, the controller 130 be configured to determine the level of warning urgency as a level 3 which may be less than the level 2. In response to determining the level of warning urgency as the level 3, the controller 130 may be configured to operate the wireless communication unit 140 to transmit a predetermined signal including data for a vibration output warning that corresponds to a predetermined vibration intensity or less to the wearable device 200.

According to exemplary embodiments, when wireless communication with the wearable device 200 is performed, the controller 130 of the vehicle 100 may be configured to vary respective data included in the predetermined signal based on device information received from the wearable device 200. The device information may include information regarding a name, a model name, version information, specifications and the like of the wearable device 200. The memory 150 may then be configured to store the device information received from the wearable device 200 and store data necessary to determine the type of the wearable device 200 based on the received device information. In particular, the type of wearable device 200 may mean whether the wearable device 200 is a watch type device, a glasses type device (e.g., optical device), or clothing type device.

As one example, in response to determining that the wearable device 200 is a watch type device based on the received device information, the controller 130 may be configured to operate the wireless communication unit 140 to transmit a predetermined signal, including at least one of data for a vibration output warning and data for an audio output warning, to the wearable device 200. As another example, in response to determining that the wearable device 200 is an optical type device based on the received device information, the controller 130 may be configured to operate the wireless communication unit 140 to transmit a predetermined signal, including at least one of data for an image output warning, data for an audio output warning and data for a light output warning, to the wearable device 200. As yet another example, in response to determining that the wearable device 200 is a clothing type device based on the received device information, the controller 130 may be configured to operate the wireless communication unit 140 to transmit a predetermined signal including data for a vibration output warning to the wearable device 200.

According to exemplary embodiments, the controller 130 of the vehicle 100 may be configured to determine presence of respective data included in the predetermined signal and size of the respective data, according to the level of warning urgency, determined based on the information collected by the information collection unit 110, and the type of the wearable device 200, determined based on the received device information.

FIG. 3 is a table illustrating one example of a database in which warning types varying according to levels of warning urgency and types of a wearable device in a danger warning system in accordance with one exemplary embodiment of the present invention.

A database including warning types varying according to levels of warning urgency and types of the wearable device 200 may be pre-stored in the memory 150 of the vehicle 100. For example, in response to determining that the level of warning urgency is a level 1 (e.g., a highest level or high) and the type (e.g., kind) of the wearable device 200 is a type 1 (e.g., a watch type), the controller 130 of the vehicle 100 may be configured to operate the wireless communication unit 140 to transmit a predetermined signal, including a vibration output warning that corresponds to a predetermined vibration intensity or greater and data for an audio output warning, to the wearable device 200.

Further, in response to determining that the level of warning urgency is a level 3 (e.g., a lowest level or low) and the type of the wearable device 200 is a type 2 (e.g., an optical type), the controller 130 of the vehicle 100 may be configured to operate the wireless communication unit 140 to transmit a predetermined signal including an image output warning that corresponds to an image of a predetermined size or less to the wearable device 200.

Figure 4:
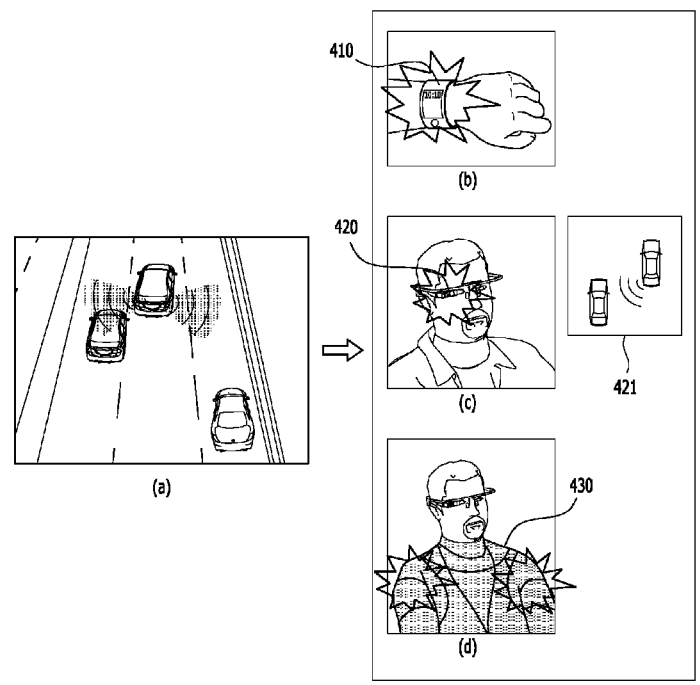
FIG. 4 is a view illustrating one exemplary danger warning method in accordance with one exemplary embodiment of the present invention.

Hereinafter, with reference to FIGS. 4 to 5, examples of the above-described danger warning method will be described in more detail. FIG. 4 is a view illustrating one exemplary danger warning method in accordance with one exemplary embodiment of the present invention.

With reference to FIG. 4 (e.g., section (a) in FIG. 4), the controller 130 of the vehicle 100 may be configured to determine whether a dangerous situation requiring a warning occurs (e.g., determination of a potential collision risk) based on information collected by the information collection unit 110 and determine a level of warning urgency in response to determining that the dangerous situation occurs (e.g., the presence of a collision risk). Additionally, in response to determining an attempt to depart from a lane (e.g., the vehicle departs from the traveling lane boundaries) based on information collected by the collision sensing unit 111 in spite of a collision danger based on the information collected by the information collection unit 110, the controller 130 may be configured to determine the level of warning urgency as a level 1 (high). Further, the controller 130 may be configured to determine the type of the wearable device 200 based on device information received from the wearable device 200, with which wireless communication is performed.

With reference to section (b) of FIG. 4, in response to determining that the wearable device 200 is a watch type device 410 based on the received device information, the controller 130 may be configured to operate the wireless communication unit 140 to transmit a signal that corresponds to a "strong vibration+sound" warning to the wearable device 200 based on the database shown in FIG. 3. The controller 230 of the wearable device 200 may be configured to receive the signal that corresponds to the "strong vibration+sound" warning via the communication unit 210 and operate the vibration module 242 to generate designated vibration and the sound output unit 243 to generate designated sound based on the received signal.

With reference to section (c) in FIG. 4, in response to determining that the wearable device 200 is an optical type device 420 based on the received device information, the controller 130 may be configured to operate the wireless communication unit 140 to transmit a signal that corresponds to an "image/light+sound" warning to the wearable device 200 based on the database shown in FIG. 3. In this exemplary embodiment, it may be assumed that such a signal includes image data that corresponds to a collision danger situation and the image data corresponds to an image 421 having a predetermined size or greater. The controller 230 of the wearable device 200 may be configured to receive the signal that corresponds to the "image/light+sound" warning via the communication unit 210 and operate the display unit 241 to output the image 421 and the sound output unit 243 to generate designated sound based on the received signal.

With reference to section (d) in FIG. 4, in response to determining that the wearable device 200 is a clothing type device 430 based on the received device information, the controller 130 may be configured to operate the wireless communication unit 140 to transmit a signal that corresponds to a "strong vibration" warning to the wearable device 200 based on the database shown in FIG. 3. The controller 230 of the wearable device 200 may be configured to receive the signal that corresponds to the "strong vibration" warning via the communication unit 210 and operate the vibration module 242 to generate designated vibration based on the received signal.

Figure 5:
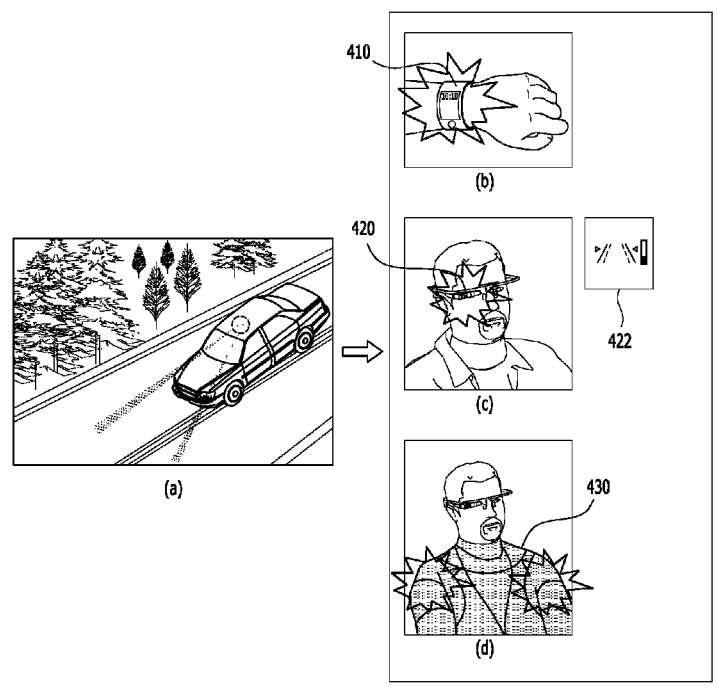
FIG. 5 is a view illustrating another exemplary danger warning method in accordance with one exemplary embodiment of the present invention.

FIG. 5 is a view illustrating another exemplary danger warning method in accordance with one exemplary embodiment of the present invention. With reference to FIG. 5 (e.g., section (a) in FIG. 5), the controller 130 of the vehicle 100 may be configured to determine whether a dangerous situation requiring a warning occurs based on information collected by the information collection unit 110 and determine a level of warning urgency in response to determining that the dangerous situation occurs. When lane departure of the vehicle 100 is sensed and the turn signal lamp 160 is turned off based on the information collected by the information collection unit 110, the controller 130 may be configured to determine the level of warning urgency as a level 3 (low). Further, the controller 130 may be configured to determine the type of the wearable device 200 based on device information received from the wearable device 200, with which wireless communication may be performed.

With reference to section (b) in FIG. 5, in response to determining that the wearable device 200 is a watch type device 410 based on the received device information, the controller 130 may be configured to operate the wireless communication unit 140 to transmit a signal that corresponds to a "weak vibration" (e.g., a vibration of less intensity compared to the strong vibration) warning to the wearable device 200 based on the database shown in FIG. 3. The controller 230 of the wearable device 200 may be configured to receive the signal that corresponds to the "weak vibration" warning via the communication unit 210 and operate the vibration module 242 to generate designated vibration based on the received signal.

With reference to section (c) in FIG. 5, in response to determining that the wearable device 200 is an optical type device 420 based on the received device information, the controller 130 may operating the wireless communication unit 140 to transmit a signal that corresponds to an "image" warning to the wearable device 200 based on the database shown in FIG. 3. In this exemplary embodiment, it may be assumed that such a signal includes image data that corresponds to lane departure and the image data corresponds to an image 422 having a predetermined size or less. The controller 230 of the wearable device 200 may be configured to receive the signal that corresponds to the "image" warning via the communication unit 210 and operate the display unit 241 to output the image 422 based on the received signal.

With reference to section (d) in FIG. 5, in response to determining that the wearable device 200 is a clothing type device 430 based on the received device information, the controller 130 may be configured to operate the wireless communication unit 140 to transmit a signal that corresponds to a "weak vibration" warning to the wearable device 200 based on the database shown in FIG. 3. The controller 230 of the wearable device 200 may then be configured to receive the signal that corresponds to the "weak vibration" warning via the communication unit 210 and operate the vibration module 242 to generate designated vibration based on the received signal.

Figure 6:
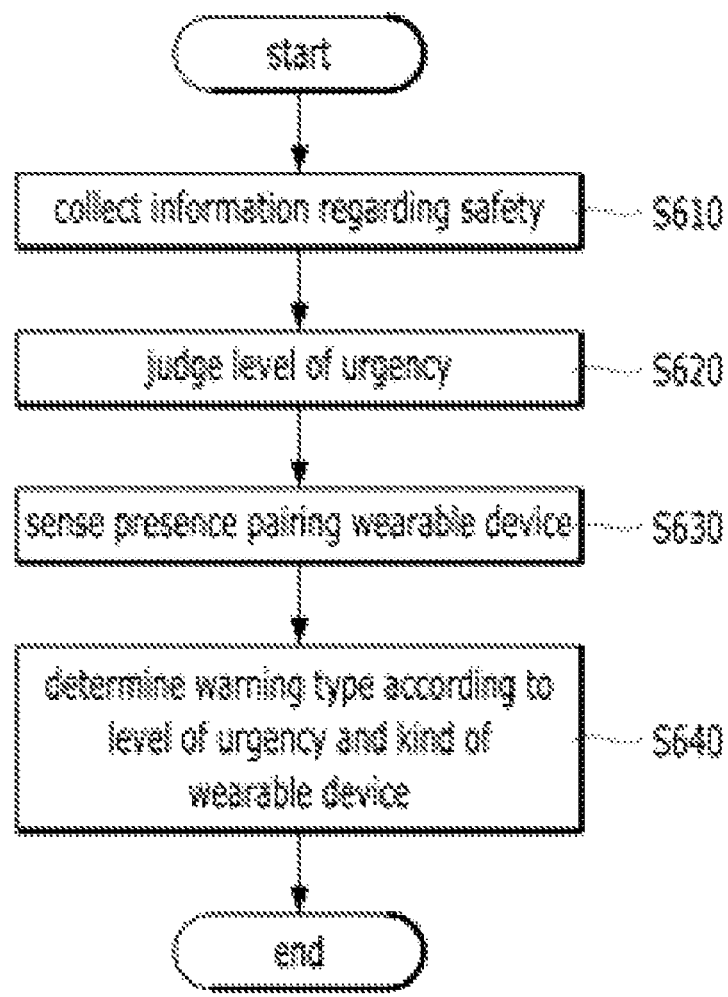
FIG. 6 is a flowchart illustrating one exemplary warning method in accordance with one exemplary embodiment of the present invention.

FIG. 6 is a flowchart illustrating one exemplary warning method in accordance with one exemplary embodiment of the present invention. The information collection unit 110 of the vehicle 100 may be configured to collect information regarding safety (Operation S610). The information collection unit 110 may also be configured to collect information regarding at least one of a collision danger, a vehicle velocity, and a lane departure of the vehicle 100. According to exemplary embodiments, in collection of information regarding safety, the information collection unit 110 may be configured to collect information regarding the state (on/off) of the turn signal lamp 160, that is, whether the turn signal lamp 160 is on or off.

In response to determining that a dangerous situation occurs based on information collected by the information collection unit 110, the controller 130 may be configured to determine a level of warning urgency according to a predetermined standard (Operation S620). Information regarding the predetermined standard used to determine the level of warning urgency may be pre-stored in the memory 150. The controller 130 may be configured to sense presence of a wearable device 200 with which wireless communication may be performed (Operation S630). When a wearable device 200 with which wireless communication may be performed is present, the controller 130 may be configured to determine the type of the wearable device 200 based on device information received from the wearable device 200.

The controller 130 may be configured to determine a warning type based on the level of urgency and the type of the wearable device 200 (Operation S640). The warning type may include at least one warning type of a vibration output warning, an image output warning, an audio output warning and a light output warning, and may further include at least one of the intensity and period of the warning.

Figure 7:
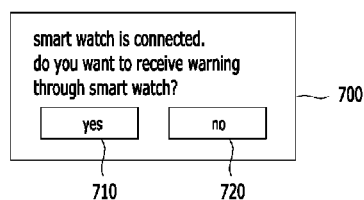
FIG. 7 is a view illustrating one exemplary message which may be output on a display unit of a vehicle in accordance with one exemplary embodiment of the present invention.

According to the exemplary embodiment of the present invention, a user may determine whether a warning is received via the wearable device 200. This will be described with reference to FIGS. 7 and 8. FIG. 7 is a view illustrating one exemplary message which may be output on a display unit of a vehicle in accordance with one exemplary embodiment of the present invention.

When wireless communication with the wearable device 200 is performed, the controller 130 of the vehicle 100 may be configured to output a message 700 on the display unit 120 to select whether a warning is received via the wearable device 200, with which wireless communication is performed. The controller 130 may then be configured to provide a warning via the wearable device 200 in the above-described manner when a user selects a 'YES' button 710 within the message 700, and may not provide a warning via the wearable device 200 when the user selects a 'NO' button 710 within the message 700. That is, based on a user selection from the output message 700, the controller 130 may be configured to determine whether to output a warning.

Although not shown in the drawings, when wireless communication with the wearable device 200 is performed, the controller 130 may be configured to output a message on the display unit 120 to select a warning type via the wearable device 200, with which wireless communication is performed. The user may accordingly select a desired warning type through such a message.

Figure 8:
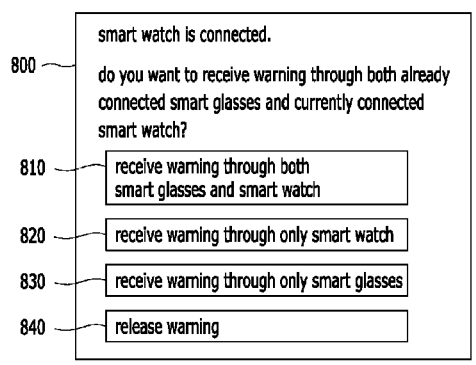
FIG. 8 is a view illustrating another exemplary message which may be output on a display unit of a vehicle in accordance with one exemplary embodiment of the present invention.

FIG. 8 is a view illustrating another exemplary message which may be output on a display unit of a vehicle in accordance with one exemplary embodiment of the present invention. When wireless communication with a wearable device 200 is performed, and another wearable device 200, with which wireless communication has been already performed, is present, the controller 130 of the vehicle 100 may be configured to output a message 800 shown in FIG. 8 on the display unit 120.

For convenience of description, the wearable device 200, with which wireless communication has been already performed, will be referred to as a first wearable device (e.g., smart glasses) and the wearable device 200, with which wireless communication is currently performed, will be referred to as a second wearable device (e.g., a smart watch). In other words, when two or more wearable devices are connected to the vehicle 100 via wireless communication, the controller 130 may be configured to output the message 800 shown in FIG. 8 on the display unit 120.

A user may select through which one of the two or more wearable devices a warning is received. For example, the message 800 may include a first menu 810 to provide a warning to both the first and second wearable devices, a second menu 820 to provide a warning only to the second wearable device, a third menu 830 to provide a warning only to the first wearable device, and a fourth menu 840 not to provide a warning to either the first and second wearable devices.

Although not shown in the drawings, the message 800 may further include a menu that allows a user to select a warning type of each wearable device, with which wireless communication is performed. In accordance with one exemplary embodiment of the present invention, the above-described method may be implemented as processor readable code in a medium in which programs are recorded. For example, processor readable media include a ROM, a RAM, a CD-ROM, a magnetic tape, a floppy disk, optical data storage media and the like, and may be implemented in the form of a carrier wave (for example, transmission via the Internet).

As apparent from the above description, the present invention may provide a warning method and system which may provide a warning to a user via a wearable device when a dangerous situation (e.g., potential collision) occurs while a vehicle is being driven. Further, the present invention may provide a warning method and system which may employ various warning types according to types of a wearable device pairing with a vehicle. The present invention may also provide a warning method and system which may employ various warning types based on levels of urgency of a dangerous situation.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A warning system, comprising:
   a wireless communication unit connected to a wearable device via short range communication;
   an information collection unit configured to collect information regarding at least one of a vehicle collision danger, a velocity of the vehicle, and lane departure of the vehicle; and
   a controller configured to transmit a predetermined signal for a warning to the wearable device via the wireless communication unit, based on the information collected by the information collection unit, wherein:
   the wireless communication unit is configured to receive device information from the wearable device, and
   the controller is configured to determine a level of warning urgency according to a predetermined standard based on the information collected by the information collection unit and to determine a presence of respective data included in the predetermined signal and a size of the respective data based on the determined level of warning urgency and the received device information.

2. The warning system according to claim 1, wherein the predetermined signal includes at least one selected from the group consisting of: data for a vibration output warning, data for an image output warning, data for an audio output warning, and data for a light output warning.

3. The warning system according to claim 2, wherein the controller is configured to:
   determine a level of warning urgency according to a predetermined standard, based on the information collected by the information collection unit; and
   determine presence of respective data included in the predetermined signal and size of the respective data, based on the determined level of warning urgency.

4. The warning system according to claim 2, wherein:
   the wireless communication unit is configured to receive device information from the wearable device; and
   the controller is configured to vary types of respective data included in the predetermined signal based on the received device information.

5. The warning system according to claim 4, wherein in response to determining that the wearable device is a watch type device based on the received device information, the predetermined signal includes at least one of the data for a vibration output warning and the data for an audio output warning.

6. The warning system according to claim 4, wherein in response to determining that the wearable device is an optical type device based on the received device information, the predetermined signal includes at least one selecting from the group consisting of: the data for an image output warning, the data for an audio output warning, and the data for a light output warning.

7. The warning system according to claim 1, wherein the controller is further configured to:
   transmit the predetermined signal including first image data to the wearable device via the wireless communication unit when a first danger is sensed based on the information collected by the information collection unit; and
   transmit the predetermined signal including second image data differing from the first image data to the wearable device via the wireless communication unit when a second danger is sensed based on the information collected by the information collection unit.

8. The warning system according to claim 1, further comprising:
a display unit,
wherein when the wearable device is connected to the wireless communication unit via short range communication, the controller is configured to output a message on the display unit, to select whether the warning is received through the wearable device.

9. The warning system according to claim 1, wherein when two or more wearable devices are connected to the wireless communication unit via short range communication, the controller is configured to output a message on a display unit to select one or more wearable devices, through which the warning is received.

10. A warning method, comprising:
performing, by a controller, short communication connection with a wearable device using a wireless communication unit;
receiving, by the controller, device information from the wearable device;
collecting, by the controller, information regarding at least one of a vehicle collision danger, a velocity of the vehicle, and lane departure of the vehicle;
determining, by the controller, a level of warning urgency according to a predetermined standard based on the collected information;
determining, by the controller, a presence of respective data included in a predetermined signal and a size of the respective data based on the determined level of warning urgency and the received device information; and
transmitting, by the controller, the predetermined signal for a warning to the wearable device based on the collected information.

11. The warning method according to claim 10, wherein the predetermined signal includes at least one selected from the group consisting of: data for a vibration output warning, data for an image output warning, data for an audio output warning, and data for a light output warning.

12. The warning method according to claim 11, further comprising:
determining, by the controller, a level of warning urgency according to a predetermined standard, based on the collected information; and
determining, by the controller, presence of respective data included in the predetermined signal and size of the respective data, based on the determined level of warning urgency.

13. The warning method according to claim 11, further comprising:
receiving, by the controller, device information from the wearable device,
wherein types of respective data included in the predetermined signal vary according to the received device information.

14. The warning method according to claim 13, wherein in response to determining that the wearable device is a watch type device based on the received device information, the predetermined signal includes at least one of the data for a vibration output warning and the data for an audio output warning.

15. The warning method according to claim 13, wherein in response to determining that the wearable device is an optical type device based on the received device information, the predetermined signal includes at least one selected from the group consisting of: the data for an image output warning, the data for an audio output warning, and the data for a light output warning.

16. The warning method according to claim 10, wherein the transmission of the predetermined signal for a warning to the wearable device based on the collected information further comprises:
when a first danger is sensed based on the collected information, transmitting, by the controller, the predetermined signal including first image data to the wearable device; and
when a second danger is sensed based on the collected information, transmitting, by the controller, the predetermined signal including second image data differing from the first image data to the wearable device.

17. The warning method according to claim 10, further comprising:
when the wearable device is connected to the wireless communication unit via short range communication, outputting, by the controller a message to select whether the warning is received via the wearable device.

18. The warning system according to claim 10, further comprising:
when two or more wearable devices are connected to the wireless communication unit via short range communication, outputting, by the controller, a message, to select one or more wearable devices through which the warning is received.

* * * * *